(12) United States Patent
Fujino et al.

(10) Patent No.: US 12,347,075 B2
(45) Date of Patent: Jul. 1, 2025

(54) INFRARED IMAGE PROCESSING DEVICE AND INFRARED IMAGE PROCESSING METHOD

(71) Applicant: Mitsubishi Electric Corporation, Tokyo (JP)

(72) Inventors: Toshiki Fujino, Tokyo (JP); Kohei Kurihara, Tokyo (JP); Koichi Yamashita, Tokyo (JP); Daisuke Suzuki, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 427 days.

(21) Appl. No.: 17/925,829

(22) PCT Filed: Jun. 25, 2020

(86) PCT No.: PCT/JP2020/024953
§ 371 (c)(1),
(2) Date: Nov. 17, 2022

(87) PCT Pub. No.: WO2021/260871
PCT Pub. Date: Dec. 30, 2021

(65) Prior Publication Data
US 2023/0177653 A1 Jun. 8, 2023

(51) Int. Cl.
*G06T 5/00* (2024.01)
*G06T 5/50* (2006.01)
(Continued)

(52) U.S. Cl.
CPC ............. *G06T 5/70* (2024.01); *G06T 5/50* (2013.01); *H04N 23/23* (2023.01); *G06T 2207/10048* (2013.01)

(58) Field of Classification Search
CPC .............. G06T 5/70; G06T 5/50; G06T 2207/10048; H04N 23/23; H04N 23/20; H04N 23/81; H04N 25/677; H04N 25/60
See application file for complete search history.

(56) References Cited

U.S. PATENT DOCUMENTS

2008/0239110 A1* 10/2008 Hara ............... H04N 25/69
348/241
2019/0387185 A1* 12/2019 Hicks ............... G06F 18/241

FOREIGN PATENT DOCUMENTS

JP 2009-105966 A 5/2009

OTHER PUBLICATIONS

International Search Report and Written Opinion mailed on Sep. 24, 2020, received for PCT Application PCT/JP2020/024953, filed on Jun. 25, 2020, 8 pages including English Translation.

* cited by examiner

*Primary Examiner* — Mekonen T Bekele
(74) *Attorney, Agent, or Firm* — XSENSUS LLP

(57) ABSTRACT

The infrared image processing device includes a thermal image sensor that receives infrared rays and outputs a signal corresponding to the infrared rays, a thermal image generation unit that generates a plurality of thermal images based on the signal, a smoothing processing unit that performs a smoothing process on each pixel of each of the plurality of thermal images by using a pixel value of a vicinal pixel, thereby calculating a plurality of smoothed images and calculating smoothed pixel values that are each image's pixel values after undergoing the smoothing, a correction coefficient calculation unit that calculates a correction coefficient set including a first correction coefficient and a second correction coefficient from the thermal images and (Continued)

the smoothed images, and a thermal image correction unit that corrects the thermal images by using the correction coefficient set.

7 Claims, 11 Drawing Sheets

(51) Int. Cl.
*G06T 5/70* (2024.01)
*H04N 23/23* (2023.01)

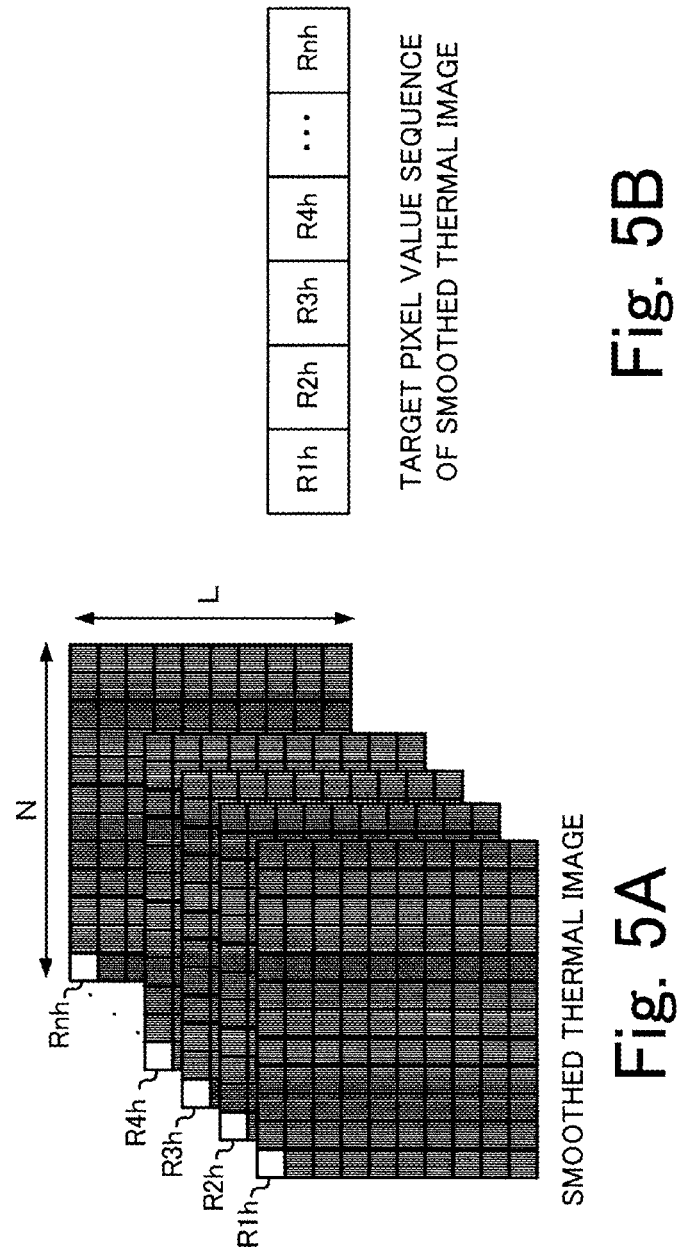

INFRARED IMAGE PROCESSING DEVICE AND INFRARED IMAGE PROCESSING METHOD

CROSS-REFERENCE TO RELATED APPLICATION

The present application is based on PCT filing PCT/JP2020/024953, filed Jun. 25, 2020, the entire contents of which are incorporated herein by reference.

TECHNICAL FIELD

The present disclosure relates to an infrared image processing device and an infrared image processing method for performing a noise reduction process on a thermal image.

BACKGROUND ART

An infrared image processing device that generates a thermal image by receiving infrared rays includes a plurality of infrared detection elements for receiving the infrared rays. For example, the infrared detection elements are arranged like a matrix so as to correspond to the image to be generated. For the infrared detection elements arranged like a matrix, separate drive wires are respectively connected to their corresponding rows or columns in which elements are aligned, and electric power is supplied from each drive wire. If there is variation among the characteristics of these drive wires, the relationship between an input value to the infrared detection element and an output value from the infrared detection element varies among rows or columns. Due to this variation, streaky noise extending in the row direction or the column direction can occur in the thermal image generated by the infrared image processing device.

To reduce such streaky noise, an image capturing device described in Patent Reference 1 proposes noise reduction according to the following method: In the image capturing device of the Patent Reference 1, images in a light blocking state are captured at constant intervals and an output signal at a light blocking time and an output signal at a light exposure time are measured. Subsequently, the image capturing device of the Patent Reference 1 reduces the noise by generating a correction signal corresponding to an offset component and a light amount dependent component of the noise from the measurement values and an ideal valve.

PRIOR ART REFERENCE

Patent Reference

Patent Reference 1: Japanese Patent Application Publication No. 2009-105966

SUMMARY OF THE INVENTION

Problem to be Solved by the Invention

In cases where images in the light blocking state are captured at constant intervals and calibration is performed by using the light-blocking images as in the above-described image capturing device of the Patent Reference 1, noise characteristics change from moment to moment due to changes in the ambient temperature or the like. Accordingly, the streaky noise suppression effect in the image capturing device decreases with the passage of time since the light blocking time (shutter time). As a result, the streaky noise occurs gradually in the image capturing device. In general, in an image capturing device, it is desirable not to increase the shutter frequency since the image turns dark at the shutter times. However, without increasing the shutter frequency, it is impossible in the image capturing device to frequently perform the calibration by using the light-blocking images. In this case, in the image capturing device, noise correction accuracy over the total time decreases.

An object of the present disclosure, which has been made to resolve the above-described problems, is to provide an infrared image processing device capable of calculating a correction coefficient for correcting the streaky noise from a plurality of images and reducing the streaky noise with high accuracy by using the calculated correction coefficient.

Means for Solving the Problem

An infrared image processing device according to the present disclosure includes
a thermal image sensor to receive infrared rays and to output a signal corresponding to the infrared rays:
a processor to execute a program; and
a memory to store the program which, when executed by the processor, performs processes of,
  generating a plurality of thermal images based on the signal;
  performing a smoothing process on each pixel of each of the plurality of thermal images by using a pixel value of a vicinal pixel, thereby calculating a plurality of smoothed images and calculating smoothed pixel values, the smoothed pixel values being pixel values after undergoing the smoothing:
  calculating a correction coefficient set from the thermal images and the smoothed images, the correction coefficient set including a first correction coefficient and a second correction coefficient; and
  correcting the thermal images by using the correction coefficient set.

Effect of the Invention

The infrared image processing device according to the present disclosure calculates the correction coefficients based on the difference in the pixel value among pixels included in a plurality of images. The streaky noise can be reduced with high accuracy by using the calculated correction coefficients.

BRIEF DESCRIPTION OF THE DRAWINGS

FIG. 5 are conceptual diagrams for explaining a smoothed thermal image and its target pixel value sequence in the infrared image processing device according to the first embodiment.

MODE FOR CARRYING OUT THE INVENTION

Figure 1:
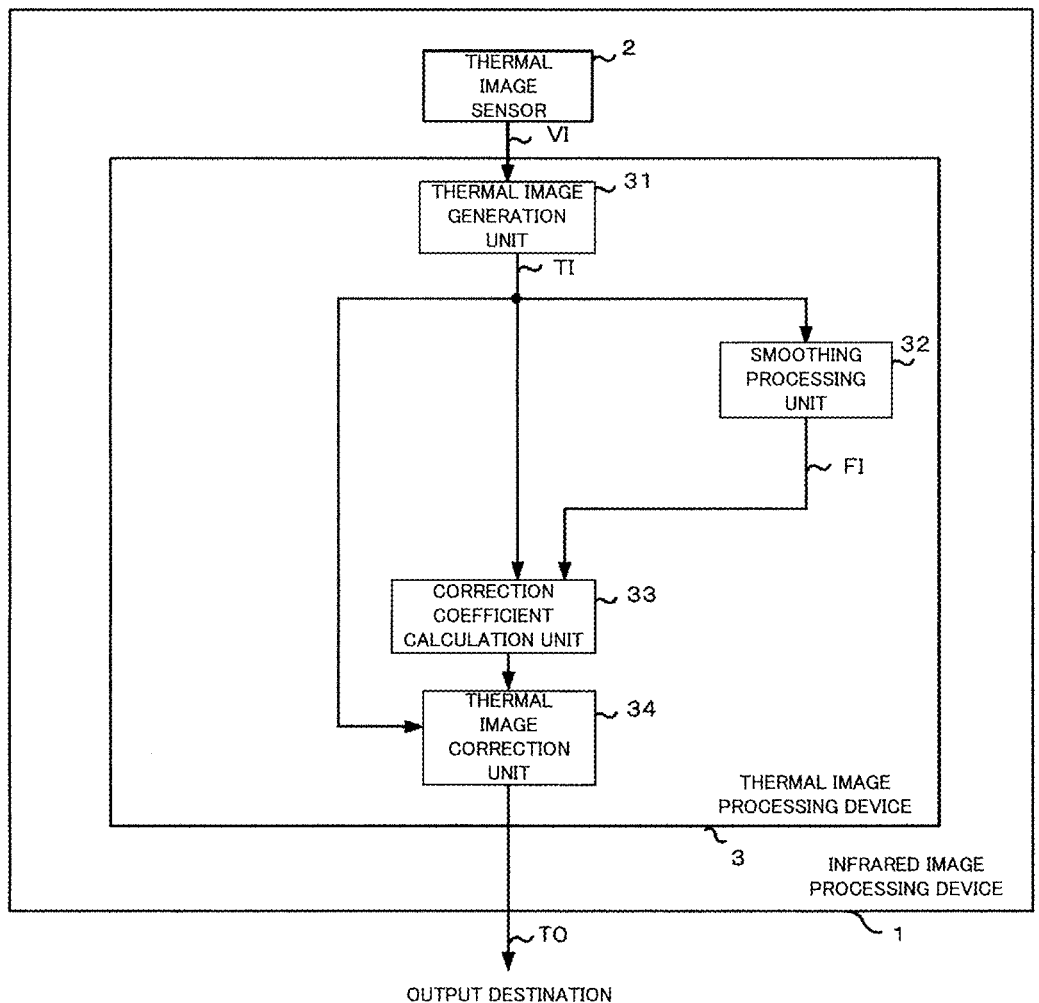
FIG. 1 is a block diagram showing the configuration of an infrared image processing device according to s first embodiment.

Embodiments will be described below by using the drawings. The same reference characters in the drawings represent the same or corresponding parts.

First Embodiment

The configuration of an infrared image processing device 1 according to a first embodiment will be described below. FIG. 1 is a block diagram showing the configuration of the infrared image processing device according to the first embodiment. The infrared image processing device 1 includes a thermal image sensor 2 and a thermal image processing device 3. The thermal image processing device 3 includes a thermal image generation unit 31, a smoothing processing unit 32, a correction coefficient calculation unit 33 and a thermal image correction unit 34. The thermal image sensor 2 sends a voltage signal VI to the thermal image generation unit 31. The thermal image generation unit 31 sends a thermal image TI to the smoothing processing unit 32, the correction coefficient calculation unit 33 and the thermal image correction unit 34. The smoothing processing unit 32 sends a smoothed image FI to the correction coefficient calculation unit 33. The correction coefficient calculation unit 33 sends a correction coefficient c and a correction coefficient d to the thermal image correction unit 34 via a memory or the like. The thermal image correction unit 34 sends a corrected thermal image TO to an output destination as the output of the thermal image processing device 3 and the infrared image processing device 1.

The thermal image sensor 2 is installed in an electrical appliance placed in a room and captures images of the inside of the room at constant intervals when the electrical appliance is in operation. Subsequently, the thermal image sensor 2 receives infrared rays (electromagnetic waves approximately from 8 μm to 12 μm) radiated from an object existing in the room and outputs the voltage signal VI corresponding to the intensity of the infrared rays. The thermal image sensor 2 is formed of a plurality of infrared detection elements that detect the infrared rays radiated from the object and output the voltage signal VI corresponding to the intensity of the infrared rays. The infrared detection element is a pyroelectric element, for example. The plurality of infrared detection elements are arranged like a matrix, in which elements aligned in the row direction are connected to one drive wire and supplied with electric power. The thermal image sensor 2 transmits the voltage signal VI outputted by the infrared detection elements to the thermal image processing device 3.

The thermal image sensor 2 transmits the voltage signal VI corresponding to the infrared rays to the thermal image processing device 3 according to order associated with the arrangement of the infrared detection elements. Incidentally, due to the electrical appliance in operation, the electrical appliance itself or an object in the vicinity of the electrical appliance is heated up. The thermal image TI is generated by the thermal image processing device 3 based on the voltage signal VI from the thermal image sensor 2, which is a captured image of a plurality of regions that are different in temperature in the room in the light exposure state. The thermal image TI includes a plurality of pixels at a certain particular pixel position from a first frame to a second frame differing in the pixel value. For example, the first frame and the second frame are adjacent frames. A frame number is a number for representing each image. For example, ten images are numbered "frame number 1" to "frame number 10". Incidentally, the pixel value is a value obtained by converting the voltage value of the voltage signal VI to a digital valve. Specifically, the pixel value is obtained by the following method: The thermal image processing device 3 stores the voltage values of the voltage signal VI in a memory or the like not shown in FIG. 1. Subsequently, the thermal image processing device 3 reads out the voltage values and information on the order and converts the voltage values to previously associated pixel values. Then, the thermal image processing device 3 arranges the pixel values by using the information on the order. The thermal image processing device 3 generates one thermal image from the arranged pixel values and stores the thermal image in a memory or the like not shown.

Figure 2:
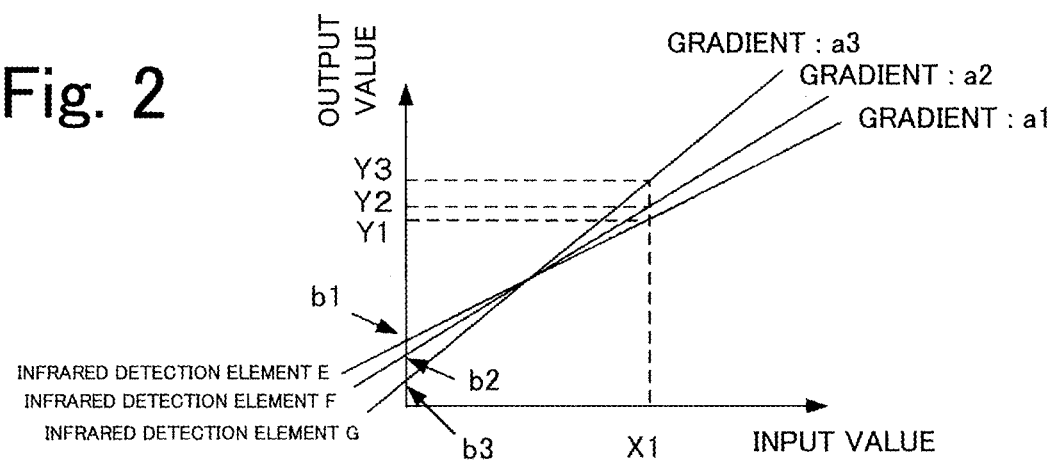
FIG. 2 is a graph showing a relationship between an input value and an output value of a thermal image sensor according to the first embodiment.

FIG. 2 is a graph showing a relationship between an input value and an output value of the thermal image sensor according to the first embodiment. The infrared detection elements explained here are subjected to influence of manufacturing errors, use environment and so forth, for example. Therefore, each individual infrared detection element has a different relationship between the input value (infrared intensity) to the infrared detection element and the output value (pixel value of the thermal image) from the infrared detection element. As shown in FIG. 2, the relationship between the input value and the output value of each infrared detection element can be represented by approximation by use of a linear function $y = ax + b$ (y: output value, x: input value, a, b: coefficient). The coefficient a and the coefficient b of the linear function differ among the infrared detection elements. For example, an infrared detection element E can be represented by a linear function using a coefficient $a_1$ and a coefficient $b_1$. An infrared detection element F can be represented by a linear function using a coefficient $a_2$ and a coefficient $b_2$. An infrared detection element G can be represented by a linear function using a coefficient $a_3$ and a coefficient $b_3$. The output value when an input value $X_1$ is inputted to the infrared detection element E is $Y_1$ ($= a_1 \cdot x_1 + b_1$). The output value when the input value $X_1$ is inputted to the infrared detection element G is $Y_3$ ($= a_3 \cdot X_1 + b_3$). As for the relationship of the output value with the input value $X_1$, the output value Y3 of the infrared detection element G is greater than the output valve Y1 of the infrared detection element E.

As described earlier, infrared detection elements aligned in the row direction are connected to the same drive wire and supplied with electric power. Therefore, the coefficient a indicating sensitivity of the infrared detection elements aligned in the row direction is influenced by the characteristics of the drive wire. The infrared detection elements aligned in the row direction have higher sensitivity compared to other infrared detection elements if the gradient is higher compared to the other infrared detection elements. Further, the coefficient b as the intercept component also changes from infrared detection element to infrared detection element similarly to the coefficient a. For the above-described reason, the output values of the infrared detection elements aligned in the row direction vary respectively. Especially, difference in the drive wire's characteristics between vertically adjacent rows affects vertically adjacent output values of the infrared detection elements. In this case, noise like a streak extending in the row direction from one end to the other end of the thermal image (hereinafter referred to as streaky noise) occurs in the thermal image. Further, in the thermal image sensor, the coefficient a indicating the sensitivity of the infrared detection elements aligned in the row direction or the coefficient b as the intercept component changes due to temporal change in the characteristics of the drive wire. Accordingly, intensity of the streaky noise also changes temporally.

The thermal image processing device 3 receives the voltage signal VI from the thermal image sensor 2. Namely, the thermal image generation unit 31 closest to an input part in the thermal image processing device 3 receives the voltage signal VI from the thermal image sensor 2. The thermal image generation unit 31 converts the voltage signal VI from the thermal image sensor 2 to the pixel values. Subsequently, the thermal image generation unit 31 generates the thermal image TI including a plurality of pixels differing in the pixel value in the direction of the occurrence of the streaky noise, from the pixel values obtained by the conversion. Then, the thermal image generation unit 31 sends the generated thermal image TI to the smoothing processing unit 32, the correction coefficient calculation unit 33 and the thermal image correction unit 34.

The smoothing processing unit 32 performs a smoothing process on each target pixel value regarding the thermal image TI by using adjacent pixel values. The smoothing processing unit 32 generates the smoothed image FI after undergoing the smoothing process and sends the smoothed image FI to the correction coefficient calculation unit 33. The aforementioned target pixel is a pixel at a pixel position as the reference when the smoothing process, a correction coefficient calculation process or a correction process is executed. The target pixel is included in a pixel sequence as a set of pixels aligned in the direction of the occurrence of the streaky noise in the thermal image TI generated by the thermal image generation unit 31. The aforementioned adjacent pixel is included in a pixel sequence that is adjacent in a direction crossing the direction of the occurrence of the streaky noise. The adjacent pixel is adjacent to the target pixel. The smoothed pixel value is the average value of the target pixel value and the adjacent pixel values.

Figure 3B:
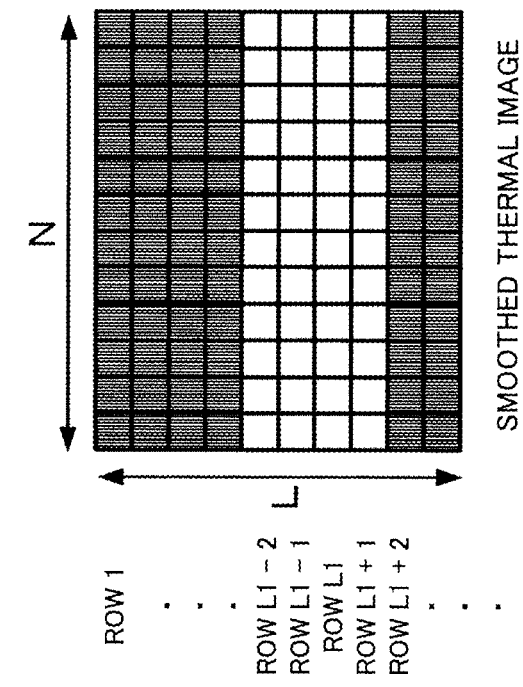
FIG. 3 are conceptual diagrams for explaining a smoothing process of the infrared image processing device according to the first embodiment.
Figure 3A:
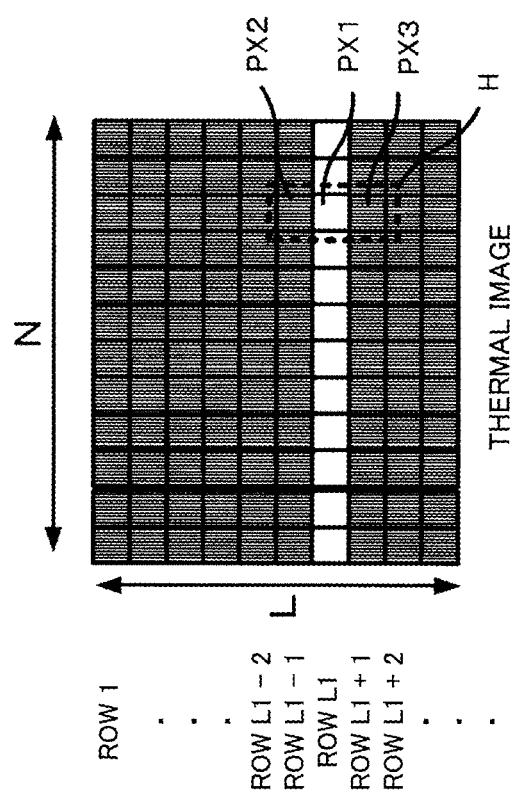

Concrete processing by the smoothing processing unit 32 will be described below. FIG. 3 are conceptual diagrams for explaining the smoothing process of the infrared image processing device 1 according to the first embodiment. FIG. 3A shows a thermal image of L rows and N columns. FIG. 3B shows a smoothed thermal image of L rows and N columns. Among the L rows, a row in which the target pixel value exists is referred to as a row L1. When smoothing the target pixel value in FIG. 3A, for example, the smoothing processing unit 32 obtains the average value of the target pixel value PX1 and corresponding adjacent pixel values PX2 and PX3. This average value is obtained from the leftmost target pixel value in the pixel sequence of the row L1 and the leftmost adjacent pixel values. The next average value is obtained by processing the second or a latter target pixel value from the left in the pixel sequence of the row L1 and the adjacent pixel values in the same way. The average value is obtained in the range of the frame H in FIG. 3A, for example.

By executing the above-described smoothing process, it is possible to obtain a smoothed thermal image formed of smoothed pixel values in which the streaky noise has been reduced in the row L1 as shown in FIG. 3B. Infrared ray distribution in the row L1 and infrared ray distribution in the adjacent rows L1−1 and L1+1 have correlation. Due to this correlation, a correspondence relationship between each target pixel value included in the row L and the smoothed pixel value included in the smoothed thermal image is maintained in the smoothing processing unit 32. By this method, the smoothing processing unit 32 calculates the smoothed pixel values in which the streaky noise has been reduced. Let z represent the smoothed pixel value, correction coefficients of a correction formula $z=cm+d$ of each row are calculated as will be described below.

The correction coefficient calculation unit 33 calculates the correction coefficient c and the correction coefficient d. The correction coefficient c and the correction coefficient d are the correction coefficients included in the correction formula $z=cm+d$. It is possible to paraphrase the correction coefficient c into a first correction coefficient, paraphrase the correction coefficient d into a second correction coefficient, and paraphrase the first correction coefficient and the second correction coefficient into a correction coefficient set. Incidentally, the pixel value z is the pixel value after the correction and the pixel value m is the pixel value in the thermal image. The correction coefficient calculation unit 33 stores the calculated correction coefficients c and d in a memory or the like not shown. The thermal image correction unit 34 corrects the image TI generated by the thermal image generation unit 31 by using the correction coefficient c and the correction coefficient d read out from the memory.

Figure 4B:
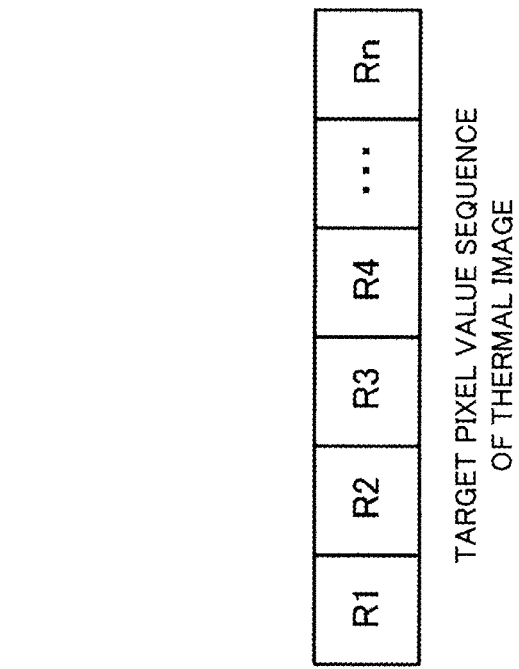
FIG. 4 are conceptual diagrams for explaining a thermal image and its target pixel valve sequence in the infrared image processing device according to the first embodiment.
Figure 4A:
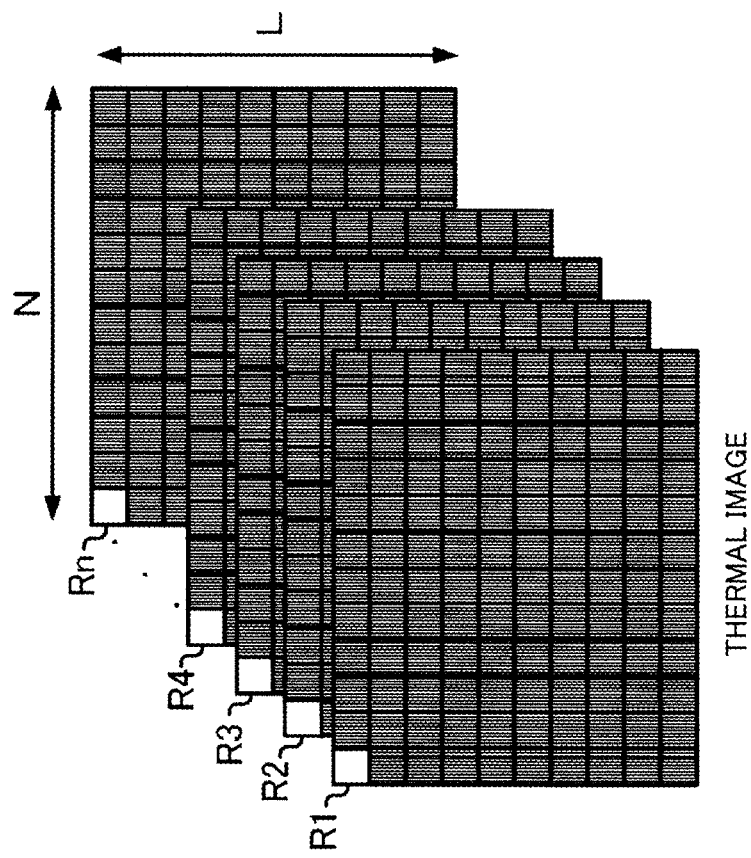

Concrete processing by the correction coefficient calculation unit 33 will be described below. FIG. 4 are conceptual diagrams for explaining the thermal image and its target pixel value sequence in the infrared image processing device according to the first embodiment. FIG. 5 are conceptual diagrams for explaining the smoothed thermal image and its target pixel value sequence in the infrared image processing device according to the first embodiment. For example, a case where a coordinate value pair is set based on the target pixel value and the smoothed pixel value in the row L and the column N will be described below. The correction coefficient calculation unit 33 reads out a target pixel value sequence from a pixel in the row L and the column N of the first frame to a pixel in the row L and the column N of the second frame in the thermal image. Based on target pixels in the row 1 and the column 1 satisfying L=1 and N=1 in the thermal image shown in FIG. 4A, a target pixel valve sequence (R1, R2, R3, ..., Rn) of the thermal image shown in FIG. 4B is set. Further, the correction coefficient calculation unit 33 reads out smoothed pixel values from a pixel in the row L and the column N of the first frame to a pixel in the row L and the column N of the second frame in the smoothed thermal image. Then, the correction coefficient calculation unit 33 sets coordinate values (R1$h$, R2$h$, R3$h$, . . . , Rn$h$) shown in FIG. 5B based on target pixels in the row 1 and the column 1 satisfying L=1 and N=1 in the smoothed thermal image shown in FIG. 5A. Then, by using each target pixel value and the corresponding smoothed pixel value, the correction coefficient calculation unit 33 sets a coordinate valve pair (e.g., (R1, R1$h$)) in which the target pixel value is specified as the m coordinate and the smoothed pixel value is specified as the z coordinate.

Figure 6:
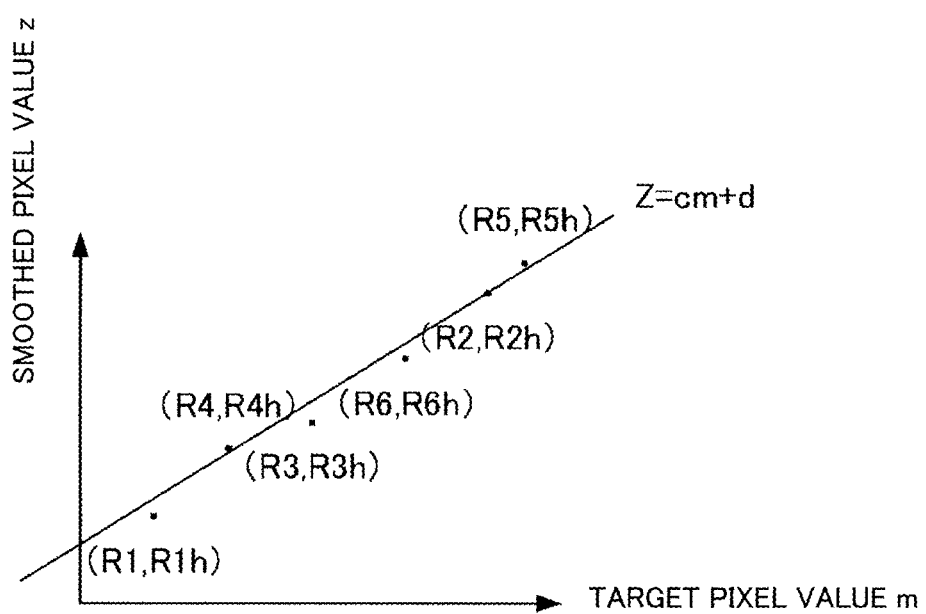
FIG. 6 is a conceptual diagram for explaining a method of calculating correction coefficients in the infrared image processing device according to the first embodiment.

FIG. 6 is a conceptual diagram for explaining the method of calculating the correction coefficients in the infrared image processing device according to the first embodiment. The correction coefficient calculation unit 33 plots the coordinate pairs that have been set in an m-z coordinate space and obtains the correction formula z=cm+d as an equation of a straight line by executing linear approximation. The correction coefficient calculation unit 33 calculates the correction coefficient c and the correction coefficient d. The correction coefficient c and the correction coefficient d vary among pixel positions. Here, a plurality of coordinate value pairs are plotted at different positions. Since the plurality of thermal images include a plurality of pixels differing in the pixel value in the direction of the occurrence of the streaky noise (the row direction) as mentioned earlier, the position of the plotting deviates. The correction coefficient calculation unit 33 calculates the correction coefficient c and the correction coefficient d based on the difference in the position, namely, the difference in the pixel value. The correction coefficient calculation unit 33 calculates the correction coefficient c and the correction coefficient d so as to minimize the distance between the coordinate value pairs that have been set and the straight line equation z=cm+d. The correction coefficient calculation unit 33 uses the least-squares method, for example, for the calculation of the correction coefficient c and the correction coefficient d. The correction coefficient calculation unit 33 stores the correction coefficients c and d in the memory (not shown) or the like.

The thermal image correction unit 34 acquires pixel values z in the thermal image TI generated by the thermal image generation unit 31. Here, the pixel values z are pixel values in regard to a pixel sequence from the target pixel in the first frame to the target pixel in the second frame. Subsequently, in regard to the pixel sequence from the target pixel in the first frame to the target pixel in the second frame, the thermal image correction unit 34 obtains the pixel values z by substituting into the correction formula using the stored correction coefficients c and d. The thermal image correction unit 34 outputs a thermal image TO formed by outputting the pixel values z in regard to the image TI, to the output destination.

Figure 7:
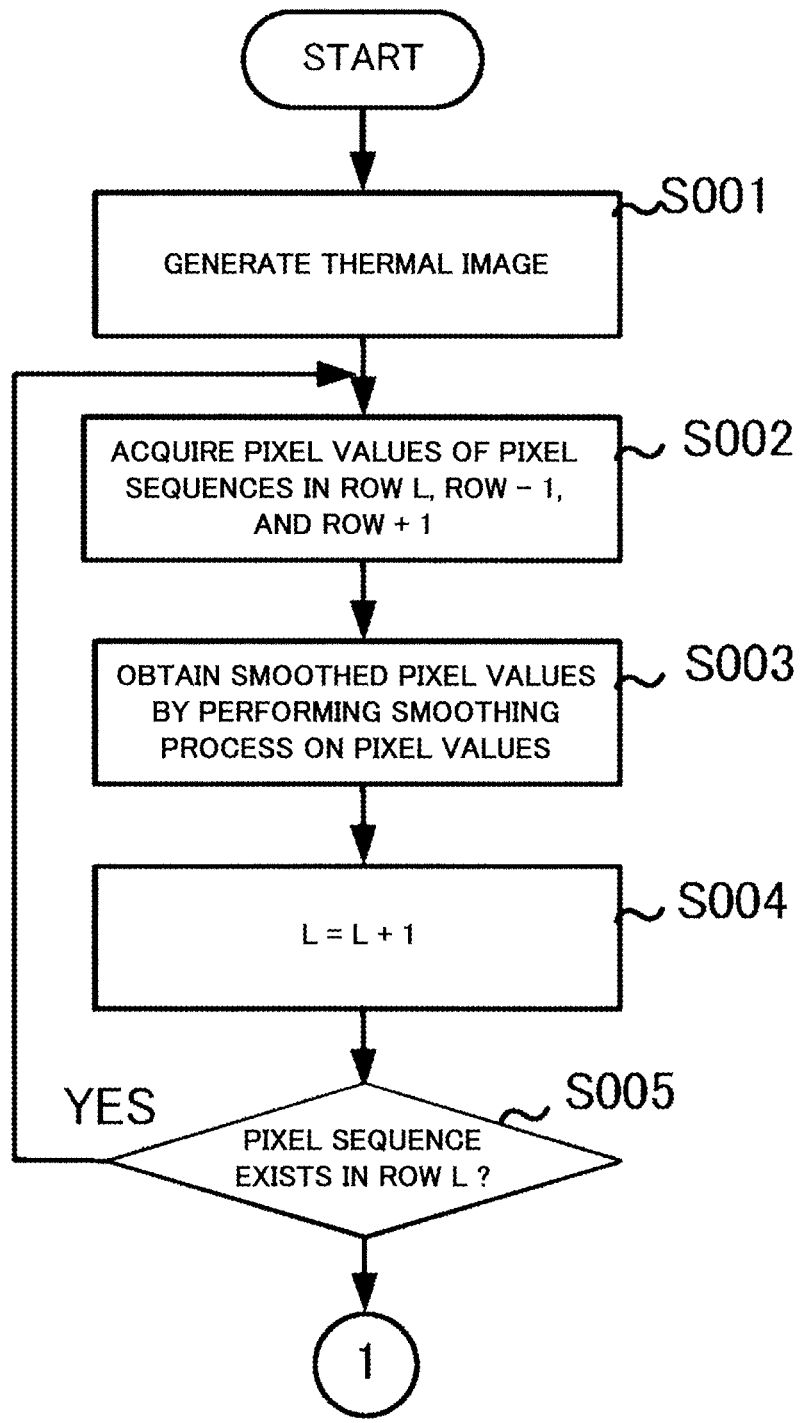
FIG. 7 is a flowchart showing a process of the infrared image processing device 1 according to the first embodiment until a smoothed image is outputted.

Next, a procedure of a process of the infrared image processing device 1 according to the first embodiment will be described below by using FIG. 7, FIG. 8 and FIG. 9. FIG. 7 is a flowchart showing a process of the infrared image processing device 1 according to the first embodiment until the smoothed image FI is outputted. The operation of the thermal image sensor. 2 and the smoothing processing unit 32 of the thermal image processing device 3 in the infrared image processing device 1 will be described below according to the flowchart of FIG. 7. The infrared image processing device 1 generates the thermal image TI, performs the smoothing process on each target pixel value by using the adjacent pixel values in regard to the thermal image TI, and outputs the smoothed image FI.

First, in step S001, the thermal image generation unit 31 generates the thermal image TI from the voltage signal VI from the thermal image sensor 2.

Subsequently, in step S002, the smoothing processing unit 32 acquires the pixel values of pixel sequences in the row L, the row L−1 and the row L+1 in the plurality of thermal images generated by the thermal image generation unit 31. Here, L is a natural number. At the start of the process of this flowchart, the infrared image processing device 1 sets L at L=1 as the initial value.

Incidentally, in the case where L=1, that is, in the case of reading out the pixel values of a pixel sequence in the uppermost row of the thermal image, the row L−1 in the thermal image does not exist. Thus, instead, the thermal image is handled assuming that a pixel sequence similar to the row L or the row L+1 exists in the row L−1 of the thermal image, for example. Namely, the pixel sequence in the row L or the row L+1 read out separately is handled as the pixel sequence in the row L−1 in the thermal image. Similarly, in regard to the lowermost row of the thermal image, the pixel sequence in the row L+1 does not exist, and thus the pixel sequence in the row I: or the row L−1 read out separately is handled as the pixel sequence in the row L+1 in the thermal image. Further, in this example, a pixel value included in the row L is the target pixel value, and pixel values respectively included in the row L−1 and the row L+1 are the adjacent pixel values.

Subsequently, in step S003, the smoothing processing unit 32 smoothes each target pixel value in the row L by using the target pixel and the adjacent pixel values of the pixels in the adjacent rows L−1 and L+1. Accordingly, the smoothing processing unit 32 obtains the smoothed pixel value of each pixel in the row L.

Subsequently, in step S004, the smoothing processing unit 32 replaces L with L+1. Subsequently, in step S005, the smoothing processing unit 32 judges whether or not a pixel sequence exists in the row I which has been replaced with I:+1 in the previous step. If a pixel sequence exists (YES in the step S005), the processing from the step S002 to the step S004 is repeated. If no pixel sequence exists (NO in the step S005), the process advances to the next step.

Figure 8:
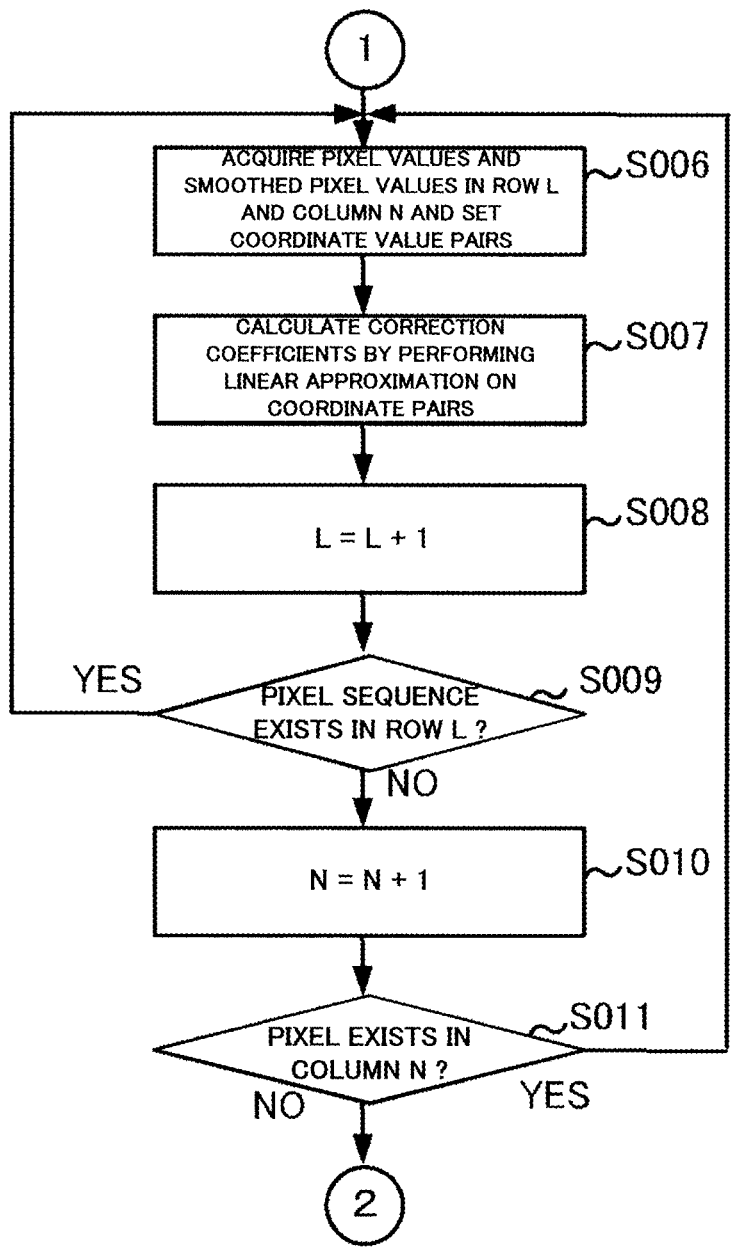
FIG. 8 is a flowchart showing a process of the infrared image processing device 1 according to the first embodiment until the correction coefficients are outputted.

FIG. 8 is a flowchart showing a process of the infrared image processing device 1 according to the first embodiment until the correction coefficient c and the correction coefficient d are outputted. The operation of the correction coefficient calculation unit 33 of the thermal image processing device 3 in the infrared image processing device 1 will be described below according to the flowchart of FIG. 8. The correction coefficient c and the correction coefficient d are the correction coefficients included in the correction formula z=cm+d. The pixel value z is the pixel value after the correction and the pixel value m is the pixel value in the thermal image. The correction coefficient calculation unit. 33 calculates the correction coefficient c and the correction coefficient d.

Step S006 is a step subsequent to the step S005. In the step S006, the correction coefficient calculation unit 33 acquires the pixel values in the row L and the column N and the smoothed pixel values in the row L and the column N and sets a plurality of coordinate value pairs by using the corresponding target pixel sequence and smoothed pixel sequence. The pixel values in the row L and the column N are the pixel values in regard to the pixel sequence from the pixel in the row L and the column N of the first frame to the pixel in the row L and the column N of the second frame. The smoothed pixel values in the row L and the column N are the smoothed pixel values in regard to the pixel sequence from the pixel in the row L and the column N of the first frame to the pixel in the row L and the column N of the second frame. L and N are natural numbers. As initial values at the time of starting the process of the infrared image processing device 1, the infrared image processing device 1 sets L and N at L=1 and N=1.

Subsequently, in step S007, the correction coefficient calculation unit 33 plots the coordinate pairs that have been set in the m-z coordinate space and obtains the straight line equation z=cm+d by executing linear approximation. Here, a plurality of coordinate value pairs are plotted at different positions. Since the plurality of thermal images include a plurality of pixels differing in the pixel value in the direction of the occurrence of the streaky noise (the row direction) as mentioned earlier, the position of the plotting deviates. The correction coefficient calculation unit 33 calculates the correction coefficients c and d based on the difference in the position, namely, the difference in the pixel value. The correction coefficient calculation unit 33 oses the least-squares method so as to minimize the distance between the coordinate value pairs that have been set and the straight line equation z=cm+d.

Subsequently, in step S008, the correction coefficient calculation unit 33 executes processing of replacing L with L+1. Subsequently, in step S009, the correction coefficient calculation unit 33 judges whether or not a pixel sequence exists in the row L which has been replaced with L+1 in the previous step. If a pixel sequence exists in the row L (YES in the step S009), the processing from the step S006 to the step S009 is repeated. If no pixel sequence exists in the row L (NO in the step S009), the correction of the pixel sequence of pixels in the column N has been finished, and thus the process advances to the next step S010.

Subsequently, in the step S010, the correction coefficient calculation unit 33 executes processing of replacing N with N+1. Subsequently, in step S011, the correction coefficient calculation unit 33 judges whether or not a pixel sequence exists in the column N which has been replaced with N+1 in the previous step. If a pixel sequence exists in the column N (YES in the step S011), the processing from the step S006 to the step S011 is repeated.

If no pixel sequence exists in the column N (NO in the step S011), the calculation of the correction coefficients c and d has been finished in all the rows of the thermal image, and thus the process advances to the next step.

Figure 9:
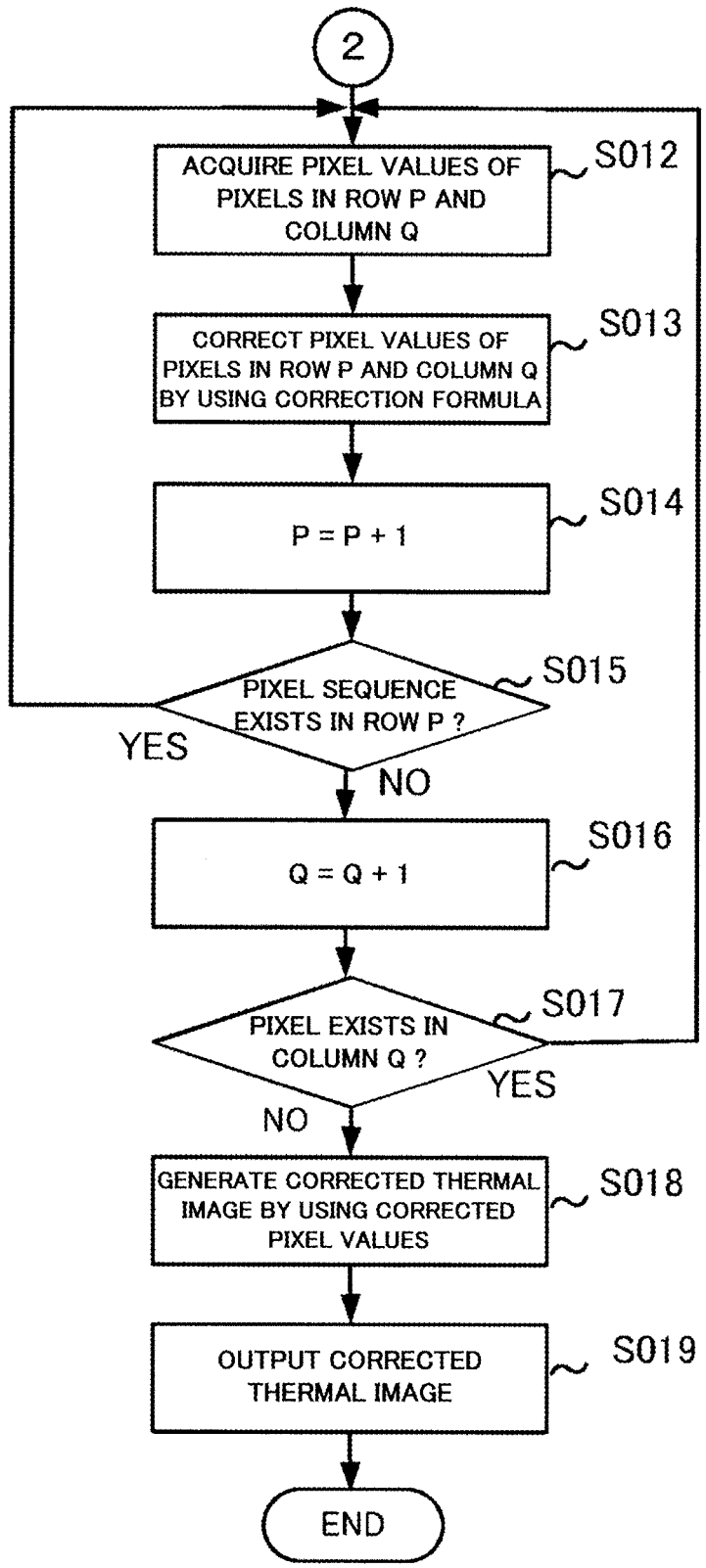
FIG. 9 is a flowchart showing a process of the infrared image processing device 1 according to the first embodiment until a corrected thermal image is outputted.

FIG. 9 is a flowchart showing a process of the infrared image processing device 1 according to the first embodiment until the corrected thermal image TO is outputted. The operation of the infrared image processing device 1 until the thermal image correction unit 34 outputs the corrected thermal image TO will be described below according to the flowchart of FIG. 9.

Step S012 is a step subsequent to the step S011. In the step S012, the thermal image correction unit 34 acquires pixel values of pixels in the row P and the column Q. The pixel values of the pixels in the row P and the column Q are pixel values in regard to a pixel sequence from a pixel in the row P and the column Q of the first frame to a pixel in the row P and the column Q of the second frame in the thermal image. P and Q are natural numbers. At the time of starting the process of the infrared image processing device 1, P and Q are set at P=1 and Q=1 as initial values.

Subsequently, in step S013, the thermal image correction unit 34 corrects the pixel values of the pixels in the row P and the column Q by using a corresponding correction formula. The pixel values of the pixels in the row P and the column Q are pixel values in regard to the pixel sequence from the pixel in the row P and the column Q of the first frame to the pixel in the row P and the column Q of the second frame. Subsequently, in step S014, the thermal image correction unit 34 executes processing of replacing P with P+1. Subsequently, in step S015, the correction coefficient calculation unit 33 judges whether or not a pixel sequence exists in the row P which has been replaced with P+1 in the previous step. If a pixel sequence exists in the row P (YES in the step S015), the processing from the step S012 to the step S014 is repeated. If no pixel sequence exists in the row P (NO in the step S015), the correction of the pixel sequence of pixels in the column Q has been finished, and thus the process advances to the next step.

Subsequently, in step 3016, the thermal image correction unit 34 executes processing of replacing Q with Q+1. Subsequently, in step S017, it is judged whether or not a pixel sequence exists in the column Q which has been replaced with Q+1 in the previous step. If a pixel sequence exists in the column Q (YES in the step S017), the processing from the step S012 to the step S016 is repeated. If no pixel sequence exists in the column Q (NO in the step S017), the correction of the pixel sequence of the pixels in the column Q has been finished, and thus the process advances to the next step.

Subsequently, in step S018, the thermal image correction unit 34 reconstructs the image by using the corrected pixel values, thereby generating the corrected image. Specifically, based on the corrected pixel values of each pixel sequence and information on the pixel positions, the thermal image correction unit 34 rearranges the pixel sequences according to the information on the pixel positions, thereby generating a plurality of thermal images.

Finally, in step S019, the thermal image correction unit 34 outputs the corrected thermal image TO to the output destination.

The infrared image processing device 1 according to the first embodiment of the present disclosure is configured as described above and achieves the following effects: The infrared image processing device 1 obtains the correction coefficient c and the correction coefficient d and corrects the thermal image TI by using the correction coefficients c and d. In contrast, in cases where the thermal image is corrected by obtaining one correction coefficient, the infrared image processing device 1 is incapable of sufficiently reducing the streaky noise. For example, when a difference value between the target pixel value and the smoothed pixel value is obtained (a coefficient d in z=m+d is obtained) and the thermal image is corrected by exclusively using the difference value, only correction of adding the difference value is possible irrespective of the input value. However, the coefficient a differs among the infrared detection elements as shown in FIG. 2. Assuming that the input value and the output value are equal to each other when a=1, when the input value changes, the output value of a high-sensitivity infrared detection element whose coefficient a is larger than a=1 changes more greatly than the change amount of the input value. Even if the output value of such an element is corrected by exclusively using the difference value, the amount of the correction ends up being insufficient. Further, for the output value of a low-sensitivity infrared detection element whose coefficient a is smaller than a=1, the amount of the correction ends up being too large. The infrared image processing device 1 is capable of reducing the streaky noise with high accuracy even when the input value changes by calculating a plurality of correction coefficients (the correction coefficient c and the correction coefficient d).

Further, since the infrared image processing device 1 uses the smoothed pixel values obtained from the thermal image, the infrared image processing device 1 is capable of calculating the correction coefficients by using the thermal image at a time of an operation in which the temperature condition is not constant. Accordingly, it becomes possible to update the correction coefficients while the process of the infrared image processing device 1 is executed.

Furthermore, the infrared image processing device 1 sets the coordinate value pairs by using the target pixel values of the thermal image and the smoothed pixel values of the smoothed thermal image and calculates the correction coefficients by performing the linear approximation on the coordinate value pairs. Therefore, the correction coefficients can be calculated just by setting the coordinate value pairs and performing the linear approximation process once, and the update of the correction coefficients can be made efficiently.

In cases where an edge part of a heat source member is situated in the row where the correction coefficients are calculated, the edge part is smoothed and the accuracy of the smoothed pixel values of the smoothed thermal image decreases. If the target pixel values are corrected by using such smoothed pixel values, the thermal image processing device 3 is incapable of obtaining an appropriate thermal image. However, in the infrared image processing device 1, the proportion of the smoothed pixel values of the edge part in all the pixels is reduced by approximating a plurality of coordinate value pairs with a straight line. Therefore, the infrared image processing device 1 is capable of inhibiting the decrease in the correction accuracy due to the edge part.

Incidentally, in the above description, the target pixel valves of the thermal image and the smoothed pixel values of the smoothed thermal image are assumed to undergo a process, such as the process of generating and correcting the thermal image in the order of the input to the thermal image sensor 2, in the order of the input of data. The order is the order of processing pixels from a pixel at one end in the column 1 and the row 1 to a pixel at the other end and subsequently processing pixels from a pixel at one end in the column 1 and the row 2 to a pixel at the other end. Incidentally, a direction from the pixel at one end to the pixel at the other end is the row direction of the thermal image. However, for example, it is also possible for the thermal image processing device 3 to sort the target pixel values of the thermal image in descending order or ascending order and perform the linear approximation on the sorted valves. In that case, the infrared image processing device 1 includes, for example, a sorting unit that sorts pixel values of a plurality of thermal images respectively in descending order or ascending order in a frame direction. It is also possible for the thermal image processing device 3 to execute a process of making the correction by sorting the smoothed pixel values of the smoothed thermal image in descending order or ascending order and performing the linear approximation on the sorted values. In that case, the infrared image processing device 1 includes, for example, a sorting unit that sorts pixel values of a plurality of smoothed thermal images respectively in descending order or ascending order in the frame direction. The thermal image processing device 3 may set the sorting direction at the direction from the pixel at one end to the pixel at the other end. The thermal image processing device 3 may also set the sorting direction at the direction of the frames, namely, a direction from the pixel in the column 1 and the row 1 to the pixel in the column 1 and the row 1 of the next frame, and to the pixel in the column 1 and the row 1 of the frame after the next frame.

Further, in the aforementioned case where the thermal image processing device 3 sets the sorting direction at the direction from the pixel at one end to the pixel at the other end, pixel values situated in an end part of a pixel sequence of the sorted pixels may be removed. Specifically, the thermal image processing device 3 successively judges whether the pixel value of each pixel exceeds a first threshold value or not starting from the largest value in the sorted pixel sequence. Subsequently, the thermal image processing device 3 deletes pixel values exceeding the threshold value from the pixel sequence. Then, the thermal image processing device 3 successively judges whether the pixel value of each pixel is less than a second threshold value or not starting from the smallest value in the sorted pixel sequence. Subsequently, the thermal image processing device 3 deletes pixel values less than the second threshold value from the pixel sequence. Incidentally, the first threshold value is larger than the second threshold value. In the thermal image processing device 3, pixel values less than the designated first threshold value and pixel values exceeding the designated second threshold value are used. In the thermal image processing device 3, it is also possible to use pixel values less than the designated first threshold value or pixel values exceeding the designated second threshold value. It is also possible to previously set the number of pixel values to be removed, without using the threshold values, and remove a corresponding number of pixel values starting from the largest value in the pixel sequence and starting from the smallest value in the pixel sequence.

Incidentally, the removal of pixel values situated in an end part of the pixel sequence of the sorted pixels means that large values and small values in the pixel sequence are not used. For example, if a light bulb, a gas heater, a human or the like exists in the room, the outline of such an object appears in the thermal image as an edge. When the smoothing process is performed on the thermal image, this edge part is smoothed and that decreases the accuracy of the smoothed pixel values. The same goes for a window or the like cooled down by outside air. By removing the edge part in the thermal image, the decrease in the accuracy of the smoothed pixel values can be inhibited. Incidentally, the removal of pixel values situated in an end part of the pixel sequence of the sorted pixels is not limited to this method as long as the maximum pixel value and the minimum pixel value in the image are detected, for example.

While the direction of the occurrence of the streaky noise is assumed to be the row direction of the thermal image in the infrared image processing device 1 described above, the direction of the occurrence of the streaky noise can also be the column direction or an oblique direction. While it has been described that the connection of each drive wire to infrared detection elements arranged in the row direction is the cause of the occurrence of the streaky noise in the row direction, the streaky noise occurs in the column direction or an oblique direction in cases where each drive wire is connected in the column direction or the oblique direction.

While the streaky noise is assumed to occur due to difference in the characteristics of the drive wire in the infrared image processing device 1 described above, the cause of the occurrence of the streaky noise is not limited to this. In cases where infrared detection elements aligned in the row direction or the like are connected together by the same output wire (a wire for transmitting a voltage signal), the streaky noise can occur due to variation in characteristics of the output wire. The same goes for cases where characteristics of an A/D converter, an amplifier or the like connected to the output wire vary. Further, in a process of generating an image, there are cases where a noise reduction process is executed besides the process of reducing the streaky noise. In cases where this process is executed for each row, the level of the noise reduction process varies from row to row and the streaky noise can occur. The infrared image processing device described above is capable of reducing such streaky noise as well in a similar manner.

Second Embodiment

Figure 10:
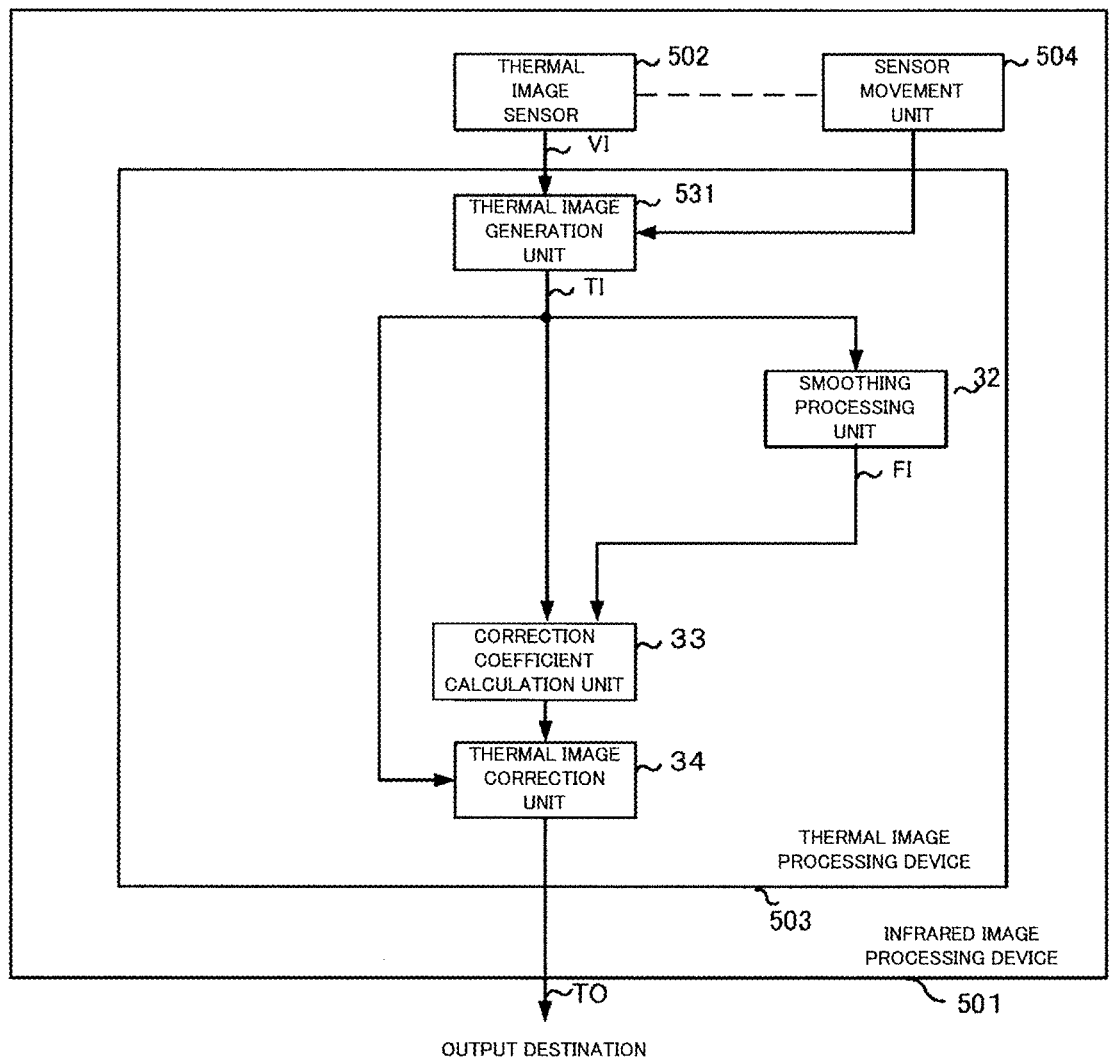
FIG. 10 is a block diagram showing the configuration of an infrared image processing device according to a second embodiment.

Next, a second embodiment of the present disclosure will be described below. FIG. 10 is a block diagram showing the configuration of an infrared image processing device according to the second embodiment. FIG. 11 are schematic diagrams of a thermal image sensor and a sensor movement unit of the infrared image processing device according to the second embodiment and schematic diagrams of thermal images. The description is omitted for features similar to the configuration and the operation described in the first embodiment, and features different from those in the first embodiment will be described below.

In the infrared image processing device in the first embodiment, the thermal image sensor 2 in which the infrared detection elements are arranged like a matrix is used. In an infrared image processing device 501 in the second embodiment, a thermal image sensor 502 in which a plurality of infrared detection elements are aligned in a column in a lengthwise direction is used. The infrared image processing device generates one thermal image by moving the thermal image sensor 502 in a transverse direction and combining together voltage signals VI as outputs of the infrared detection elements. By repeating this operation, the infrared image processing device 501 generates a plurality of images.

In the infrared image processing device 501 in the second embodiment, the configuration of the thermal image sensor 502 differs from that of the thermal image sensor 2 in the first embodiment as described above, and further, a sensor movement unit 504 is added to the configuration of the infrared image processing device 1 in the first embodiment as shown in FIG. 10. The thermal image sensor 502 is a sensor in which a plurality of infrared detection elements are aligned in a column in the lengthwise direction. The sensor movement unit 504 moves the thermal image sensor 502 in the transverse direction so as to change the position of the thermal image sensor 502. Namely, the sensor movement unit 504 moves the thermal image sensor 502 in a direction crossing the direction of the alignment of the thermal image sensor 502. For example, the sensor movement unit 504 is a motor. A rotary shaft of the motor is connected to the thermal image sensor 502, by which rotary movement of the motor is transmitted to the thermal image sensor 502. In FIG. 10, the connection of the thermal image sensor 502 and the sensor movement unit 504 is indicated by a dotted line connecting them to each other. Further, the sensor movement unit 504 includes a rotary encoder. The sensor movement unit 504 transmits a signal indicating a movement amount of the thermal image sensor 502 as the amount of rotation of the motor to a thermal image processing device 503 (more specifically, a thermal image generation unit 531).

The thermal image generation unit 531 in the infrared image processing device 501 in the second embodiment receives a voltage signal VI corresponding to infrared rays received along with rotational movement of the thermal image sensor 502 from the thermal image sensor 502 and receives the signal indicating the movement amount transmitted from the sensor movement unit 504. The thermal image generation unit 531 generates one thermal image by rearranging the voltage signal VI.

Figure 11C:
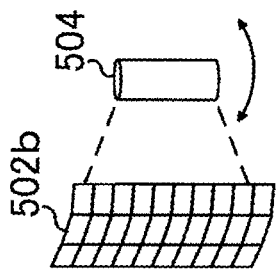
FIG. 11 are schematic diagrams of a thermal image sensor and a sensor movement unit of the infrared image processing device according to the second embodiment and schematic diagrams of thermal images.
Figure 11B:
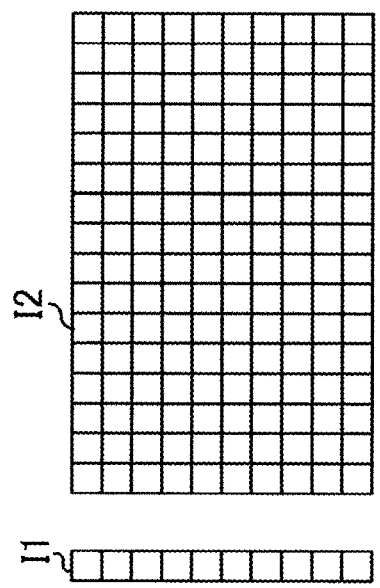
Figure 11A:
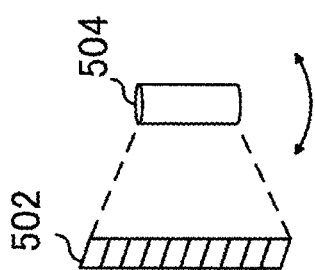

As shown in FIG. 11A, the thermal image sensor 502 rotates to draw an arc concentrically with a rotation axis and transmits the voltage signal VI corresponding to the received infrared rays. Incidentally, while the thermal image sensor 502 and the sensor movement unit 504 are connected to each other by dotted lines in FIG. 11A, the thermal image sensor 502 and the sensor movement unit 504 are connected to each other by a structure in reality. As shown in FIG. 11B, the thermal image sensor 502 obtains one thermal image I2 by combining a thermal image I1 generated from a voltage signal VI at a certain position in the rotational movement with thermal images I1 at a plurality of positions.

In the infrared image processing device 1 described above, the thermal image sensor 502 in which a plurality of infrared detection elements are aligned in a column in the lengthwise direction is used. However, as shown in FIG. 11C, the infrared image processing device 501 may also arrange infrared detection elements like a matrix in an arc-like shape and including some rows (three rows in FIG. 11C) along with the rotary movement of the sensor movement unit 504. In this infrared image processing device 1, one thermal image is generated by receiving a voltage signal VI corresponding to infrared rays received along with rotational movement of the thermal image sensor 502b and the signal indicating the movement amount transmitted from the sensor movement unit 504.

The infrared image processing device 501 according to the second embodiment of the present disclosure is configured as described above and achieves the following effects: The infrared image processing device 501 in the second embodiment makes it possible to capture the thermal image even with a smaller number of infrared detection elements. By reducing the number of infrared detection elements, the infrared image processing device can be implemented by a device of a smaller scale compared to the configuration of the infrared image processing device 501 in the first embodiment.

Further, the streaky noise can occur even when the thermal image is captured by the infrared image processing device 501 in the second embodiment. If the coefficient a (sensitivity) or the coefficient b as the intercept component in the expression y=ax+b indicating the relationship between the input and the output differs among the infrared detection elements aligned in the lengthwise direction, streaky noise in the transverse direction can occur when the images are combined together. However, the infrared image processing device 501 in the second embodiment is capable of calculating the correction coefficients similarly to the first embodiment and the like, and thus the infrared image processing device 501 is capable of executing the process of reducing the streaky noise. Besides, the infrared image processing device 501 according to the second embodiment achieves effects similar to those in the first embodiment.

While an example of moving the position of the thermal image sensor 502 by using the sensor movement unit 504 has been shown in the second embodiment, it is also possible to fix the thermal image sensor 502 on the rotary shaft of the motor and change the direction of the thermal image sensor 502.

While the coefficients and the correction coefficients are calculated by using a linear function as the straight line equation and the correction formula in the infrared image processing device 1 and the infrared image processing device 501 described above, it is also possible to use a polynomial function such as a cubic function. By using a high-dimension polynomial function, the pixel values can be approximated with high accuracy. In the case of using a high-dimension polynomial function, the number of correction coefficients is two or more.

In the infrared image processing device 1 and the infrared image processing device 501 described above, pyroelectric elements are used as the infrared detection elements. However, the infrared image processing device 501 may use infrared detection elements of a different type, such as the thermopile type in which a thermocouple causing the Seebeck effect is connected or the bolometer type employing the change in the resistance value due to temperature information. Further, the infrared image processing device 501 can be of any type as long as infrared rays can be detected.

In the infrared image processing device 1 described above, the thermal image generation unit 31 included in the thermal image processing device 3 is assumed to generate the thermal image by receiving the voltage signal VI of the thermal image sensor. Alternatively, in the infrared image processing device 501, the thermal image generation unit 531 included in the thermal image processing device 503 is assumed to generate the thermal image by receiving the voltage signal VI of the thermal image sensor. However, it is also possible to provide the thermal image generation unit 31 in the thermal image sensor 2 or to provide the thermal image generation unit 531 in the thermal image sensor 502.

In the infrared image processing device 1 and the infrared image processing device 501 described above, the process of obtaining the average value of the target pixel value and the adjacent pixel valves is executed as the smoothing process. However, the infrared image processing device 1 or the infrared image processing device 501 may also be configured to obtain the average value by assigning weights respectively to the target pixel value and the adjacent pixel values used for obtaining the average value. Further, the infrared image processing device 1 or the infrared image processing device 501 may also be configured to obtain the average value exclusively from the adjacent pixel values without using the target pixel value. Furthermore, the infrared image processing device 1 and the infrared image processing device 501 execute the smoothing process by using three pixel values including the target pixel value and two adjacent pixel values. However, the infrared image processing device 1 or the infrared image processing device 501 may also be configured to execute the smoothing process by using five pixel values, namely, by further using two pixel values adjacent to the adjacent pixel values. The infrared image processing device 1 or the infrared image processing device 501 may also be configured to execute the smoothing process by using five or more pixel values including an adjacent pixel value.

The infrared image processing device 1 and the infrared image processing device 501 described above are assumed to be installed in an electrical appliance in a room. However, by installing the infrared image processing device 1 or the infrared image processing device 501 in an electrical appliance, the thermal image can be used for controlling the electrical appliance. Further, the infrared image processing device 1 or the infrared image processing device 501 can use the thermal image for checking the temperature condition in the room in which the electrical appliance is placed. Furthermore, the infrared image processing device 1 or the infrared Image processing device 501, namely, the above-described infrared image processing device, may be not only installed in an electrical appliance but also used as a camera for security or monitoring placed indoors or outdoors.

Figure 12:
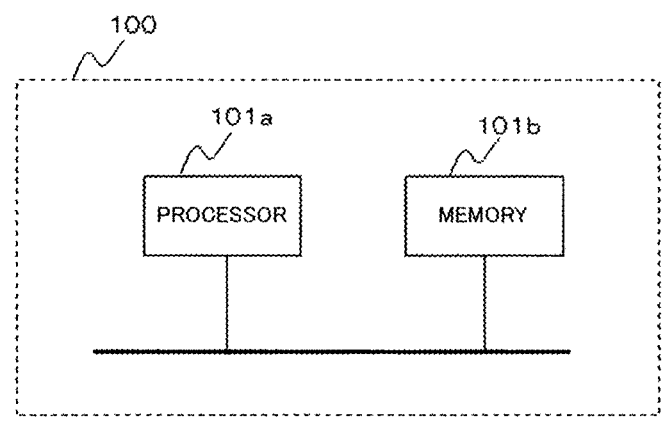
FIG. 12 is a diagram showing an example of the hardware configuration of the respiration information estimation device according to the second embodiment.
Figure 13:
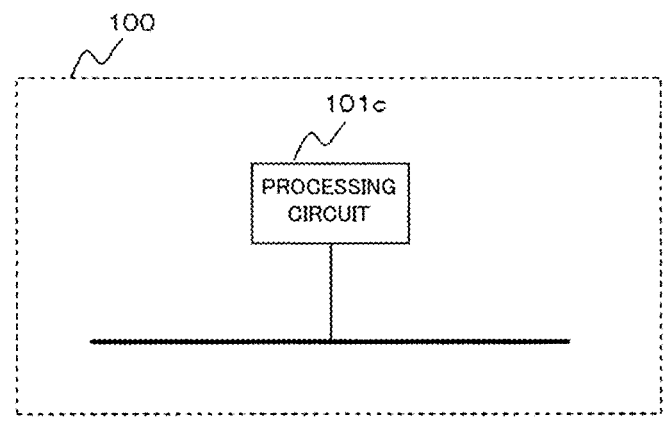
FIG. 13 is a diagram showing another example of the hardware configuration of the respiration information estimation device according to the second embodiment.

FIG. 12 is a diagram showing an example of the hardware configuration of the thermal image processing device 503 (thermal image processing device 3). FIG. 13 is a diagram showing another example of the hardware configuration of the thermal image processing device 3.

The thermal image processing device 503 is formed with at least one processor 101a and memory 101b, for example. The processor 101a is a Central Processing Unit (CPU) that executes a program stored in the memory 101b, for example. In this case, the functions of the thermal image processing device 503 are implemented by software, firmware, or a combination of software and firmware. The software and the firmware are stored in the memory 101b as programs. With this configuration, a program for implementing the functions of the thermal image processing device 503 is executed by a computer.

The memory 101b is a computer-readable record medium, such as a volatile memory like a PAM (Random Access Memory) or a ROM (Read Only Memory), a nonvolatile memory, or a combination of a volatile memory and a nonvolatile memory.

The thermal image processing device 503 may also be formed with a processing circuit 101c as dedicated hardware such as a single circuit or a combined circuit. In this case, the functions of the thermal image processing device 503 are implemented by the processing circuit 101c.

While embodiments of the present invention have been described as above, the present invention is not limited to these embodiments.

DESCRIPTION OF REFERENCE CHARACTERS

1: infrared image processing device, 2: thermal image sensor, 3: thermal image processing device, 31: thermal image generation unit, 32: smoothing processing unit, 33: correction coefficient calculation unit, 34: thermal image correction unit, 504: sensor movement unit

What is claimed is:

1. An infrared image processing device comprising:
a thermal image sensor to receive infrared rays and to output a signal corresponding to the infrared rays:
a processor to execute a program; and
a memory to store the program which, when executed by the processor, performs processes of,
generating a plurality of thermal images based on the signal;
performing a smoothing process on each pixel of each of the plurality of thermal images by using a pixel value of a vicinal pixel, thereby calculating a plurality of smoothed images and calculating smoothed pixel values, the smoothed pixel values being each image's pixel values after undergoing the smoothing:
calculating a correction coefficient set from the thermal images and the smoothed images, the correction coefficient set including a first correction coefficient and a second correction coefficient; and
correcting the thermal images by using the correction coefficient set.

2. The infrared image processing device according to claim 1, wherein calculating the correction coefficient set by approximating a plurality of coordinate value pairs represented by pixel values at a particular pixel position in a first frame to a second frame in the plurality of thermal images and pixel values at the particular pixel position in a first frame to a second frame in the plurality of corresponding smoothed thermal images, by using a polynomial function.

3. The infrared image processing device according to claim 1, further comprising sorting the pixel values of the plurality of thermal images and the pixel values of the plurality of smoothed thermal images respectively in descending order or ascending order in a frame direction,
- wherein approximating coordinate values represented by pixel values of pixels aligned in the frame direction and order of the pixel values and coordinate values represented by pixel values of the smoothed thermal images and order of the pixel values respectively by using a polynomial function and calculates the correction coefficient set by using coefficients of each polynomial function.

4. The infrared image processing device according to claim 3, wherein
- calculating the correction coefficient set by using pixel values less than a designated first threshold value or pixel values exceeding a designated second threshold value, and
- the first threshold value is larger than the second threshold value.

5. The infrared image processing device according to claim 1, wherein the thermal image is an image captured by the thermal image sensor in a light exposure state.

6. The infrared image processing device according to claim 1, further comprising moving the thermal image sensor so as to change a position or a direction of the thermal image sensor,
- wherein generating one or more thermal images from the signal corresponding to the infrared rays received by the thermal image sensor while moving.

7. An infrared image processing method comprising:
receiving infrared rays and outputting a signal corresponding to the infrared rays:
generating a plurality of thermal images based on the signal:
performing a smoothing process on each pixel of each of the plurality of thermal images by using a pixel value of a vicinal pixel, thereby calculating a plurality of smoothed images and calculating smoothed pixel values, the smoothed pixel values being each image's pixel values after undergoing the smoothing:
calculating a correction coefficient set from the thermal images and the smoothed images, the correction coefficient set including a first correction coefficient and a second correction coefficient; and
correcting the thermal images by using the correction coefficient set.

* * * * *